United States Patent
Vollkommer et al.

(10) Patent No.: US 10,442,907 B2
(45) Date of Patent: Oct. 15, 2019

(54) METHOD FOR PRODUCING A BARRIER LAYER AND CARRIER BODY COMPRISING SUCH A BARRIER LAYER

(71) Applicants: OSRAM OLED GmbH, Regensburg (DE); CIC nanoGUNE Consolider, Donostia (ES)

(72) Inventors: Frank Vollkommer, Gauting (DE); Klaus-Dieter Bauer, Landau an der Isar (DE); Juergen Bauer, Wielenbach (DE); Mato Knez, Donostia (ES); Keith Edward Gregorczyk, Donostia (ES)

(73) Assignees: OSRAM OLED GmbH, Regensburg (DE); CIC NANOGUNE CONSOLIDER, Donostia (ES)

( * ) Notice: Subject to any disclaimer, the term of this patent is extended or adjusted under 35 U.S.C. 154(b) by 262 days.

(21) Appl. No.: 15/327,997

(22) PCT Filed: Jul. 24, 2014

(86) PCT No.: PCT/EP2014/065957
§ 371 (c)(1),
(2) Date: Jan. 20, 2017

(87) PCT Pub. No.: WO2016/012046
PCT Pub. Date: Jan. 28, 2016

(65) Prior Publication Data
US 2017/0145177 A1     May 25, 2017

(51) Int. Cl.
C08J 7/12    (2006.01)
B23B 9/04    (2006.01)
C08J 5/18    (2006.01)

(52) U.S. Cl.
CPC . *C08J 7/12* (2013.01); *C08J 5/18* (2013.01); *C08J 2367/02* (2013.01)

(58) Field of Classification Search
None
See application file for complete search history.

(56) References Cited

U.S. PATENT DOCUMENTS 9,263,359 B2 * 2/2016 Dickey ............... H01L 23/291
9,376,750 B2 * 6/2016 George ............... B01J 31/069
(Continued)

FOREIGN PATENT DOCUMENTS

DE    102012207172 A1    10/2013
WO    2010135107 A1    11/2010
(Continued)

OTHER PUBLICATIONS

Huber, C. et al., "Development of a New, Highly Sensitive Sensor for Permeation Measurement, Optical Sensors used for Permeation Testing of High Barrier Materials," PreSens, Precision Sensing, Application Note, downloaded from https://www.presens.de/knowledge/publications/application-note/development-of-a-new-highly-sensitive-sensor-for-permeation-measurement-591.html on Mar. 6, 2017, 2 pages.

*Primary Examiner* — Tae H Yoon
(74) *Attorney, Agent, or Firm* — Slater Matsil, LLP (57) ABSTRACT

A method for producing a barrier layer and a carrier body including such a barrier layer are disclosed. In an embodiment the method includes providing a carrier body including a polymer film having at least one polymer, drying the barrier interface, exposing the barrier interface to one reagent gas, or to a plurality of reagent gases which do not chemically react with each other, so that the at least one reagent gas chemically reacts with the at least one polymer at least inside the polymer film in at least one chemical reaction thereby forming the barrier layer, and removing at least one product gas of the at least one chemical reaction.

16 Claims, 6 Drawing Sheets

(56) References Cited

U.S. PATENT DOCUMENTS

| | | |
|---|---|---|
| 2008/0182101 A1 | 7/2008 | Carcia et al. |
| 2013/0177760 A1 | 7/2013 | Dickey |
| 2015/0072119 A1* | 3/2015 | George .............. C23C 16/0272 |
| | | 428/212 |
| 2015/0132872 A1 | 5/2015 | Bauer et al. |
| 2015/0255748 A1* | 9/2015 | Boesch .............. H01L 51/5253 |
| | | 428/447 |
| 2015/0349295 A1* | 12/2015 | Boesch ................ H01L 51/448 |
| | | 428/212 |

FOREIGN PATENT DOCUMENTS

| | | |
|---|---|---|
| WO | 2013155462 A1 | 10/2013 |
| WO | 2013188613 A1 | 12/2013 |

\* cited by examiner

METHOD FOR PRODUCING A BARRIER LAYER AND CARRIER BODY COMPRISING SUCH A BARRIER LAYER

This patent application is a national phase filing under section 371 of PCT/EP2014/065957, filed Jul. 24, 2014 and is incorporated herein by reference in its entirety.

TECHNICAL FIELD

A method for producing a barrier layer is provided. Moreover, a carrier body comprising such a barrier layer is provided.

SUMMARY OF THE INVENTION

Embodiments of the invention provide a method for producing a barrier layer which shows a low permeability against diffusion of oxygen and/or water vapor.

In accordance with at least one embodiment, the method comprises the step of providing a carrier body. The carrier body is a solid state body at room temperature. The carrier body can be constituted of one or more than one component and/or material.

In accordance with at least one embodiment, the carrier body comprises one or more than one polymer film. The polymer film comprises at least one polymer or consists of one or a plurality of polymers. The polymer can be natural or synthetic or a mixture thereof. For example, an average number of subunits comprised of monomers and/or oligomers or repeating units in a polymer macro molecule or in a polymer chain, also referred to as a chain length, is at least 100 or 200 or 400 and/or at most 5000 or 2000 or 1000. Different macro molecules or polymer chains can be cross-linked with each other or can be distinct so that no, or no significant, covalent bonding is present in the polymer between the macro molecules or polymer chains themselves without further components that are not an integral component of the macro molecules or polymer chains themselves at the beginning of the described method. The polymer might be a copolymer.

It is possible that the carrier body consists of the one or the plurality of polymer films. Thus, the carrier body can be exclusively made of organic material.

In accordance with at least one embodiment, the polymer film forms a barrier interface of the carrier body. In particular, the barrier interface is a boundary surface of the carrier body, preferably an outer boundary surface. As an alternative, it is possible that the barrier interface lies within the carrier body. In this case, a further material of the carrier body can be applied onto the barrier interface. The term "barrier interface" could mean that a barrier is created at or near the barrier interface, in particular for diffusion of gases like oxygen or water vapor. The term "barrier" may mean that a specific permeability of a material to be blocked decreases at the interface, for example, by at least a factor of two or five or ten or 100, in particular for oxygen and/or water vapor.

In accordance with at least one embodiment, the method comprises the step of drying the barrier interface and/or the outer boundary surface of the carrier body. The term drying can be specifically addressed to water and, thus, can mean the removal of water. By means of this method step, liquid water in particular is removed from the barrier interface and/or the outer boundary surface. Moreover, it is possible that a water content in the polymer film itself, preferably at least near the barrier interface, is reduced, for example, by at least a factor of 1.5 or 2 or 3. It is not necessary that the polymer film near the barrier interface is completely free of water.

In accordance with at least one embodiment, the method comprises the step of exposing the barrier interface and/or the boundary surface to one or to a plurality of reagent gases. The at least one reagent gas is intended to chemically react with the at least one polymer of the polymer film. Preferably, the polymer is the only component of the carrier body the reagent gas reacts with. If there is more than one reagent gas then it is possible that the different reagent gases are applied at the same time or consecutively.

In accordance with at least one embodiment, a plurality of reagent gases is used. These reagent gases are not designed to chemically react with each other. Thus, no chemical reaction occurs between the reagent gases themselves.

In accordance with at least one embodiment, the reagent gas chemically reacts with the at least one polymer of the polymer film at least or exclusively inside the polymer film. In this context, inside can mean that the chemical reaction occurs near the barrier interface and, thus, for example, in a depth of the polymer film of some 10 nm to some 100 nm. Preferably, the chemical reaction does not or does not significantly occur at the barrier interface and/or at the outer boundary surface. It is possible that the interface and/or the boundary surface is not significantly changed by the chemical reaction.

In accordance with at least one embodiment, with the chemical reaction between the reagent gas and the at least one polymer, the barrier layer is formed. In other words, the barrier layer can be that region of the polymer film that is modified by the chemical reaction between the reagent gas and the polymer. Due to the chemical reaction, physical properties of the polymer film are changed in the barrier layer, in particular diffusion rates for gases like oxygen and water vapor are changed, preferably decreased.

By the chemical reaction, preferably a basic structure of the material in the barrier layer is not changed. The term "basic structure" can mean that the material is still at least one polymer and is still organic. Further, this term can mean that no or virtually no material of the polymer is removed and/or destroyed. However, the term "no removal" does not exclude the removal or replacement of peripheral, light components of the polymer like hydrogen. In particular, the backbone of the polymer might not be significantly cracked by the chemical reaction. Thus, the backbone of the polymer can remain fairly intact during the chemical reaction, so that a polymer is still present. As an alternative, the backbone of the polymer chains is cracked to a certain extent, wherein the cracks are mostly cross-linked again by means of a constituent of the reagent gas.

Preferably, the chemical reaction is performed without the use of liquid reagents. In other words, the chemical reaction can be a reaction between a solid and a gas only, namely the polymer and the reagent gas. Thus, the chemical reaction is not a wet chemical reaction. This does not rule out that the reagent gas is a liquid or solid at room temperature and normal pressure but is evaporated for the chemical reaction.

In accordance with at least one embodiment, during the chemical reaction at least one product gas is produced. Preferably, the product gas is volatile. Particularly, the product gas is a small molecule with a molecular mass of at most 200 u or 120 u or 80 u or 40 u or 20 u. In this context, u stands for atomic mass unit. Usually, the product gas is a by-product of the chemical reaction and can normally be considered as waste. Further, the product gas can be an undesired product of the chemical reaction as the desired bridge-forming could be slowed down by the product gas.

In accordance with at least one embodiment, the method comprises the step of partially or completely removing the at least one product gas. It is possible that remaining reagent gas and the product gas are removed at the same time. The removal of the product gas is done, e.g., by reducing a pressure and/or by flushing with another gas, in particular an inert gas.

According to at least one embodiment, the method is for producing a barrier layer in a polymer film and comprises at least the steps of, preferably in the stated order: A) providing a carrier body comprising the polymer film which is made from at least one polymer, the polymer film forming a barrier interface of the carrier body, B) drying the barrier interface, C) exposing the barrier interface to one reagent gas, or to a plurality of reagent gases which do not chemically react with each other, so that the at least one reagent gas chemically reacts with the at least one polymer at least inside the polymer film in at least one chemical reaction and so forming the barrier layer, and D) removing at least one product gas of said at least one chemical reaction.

A variety of next generation organic electronics including organic light emitting diodes or OLEDs for short, organic solar cells, organic transistors, and integrated circuits are currently being pursued by both academia and industry. A major technological hurdle that has yet to be overcome is to create gas permeation barriers, in particular for $O_2$ and $H_2O$, wherein said barriers should be mechanically flexible and robust enough to survive both roll-to-roll production and user lifetimes of about ten years. Particularly problematic is that even small exposures to oxygen and water vapor can severely degrade, if not destroy, such a device.

Moreover, with the described barrier layer not only inorganic or organic electronic devices can be protected. Protection against environmental chemical substances like sulfur containing substances can be reached, too, not only protection against oxygen or water. For example, sensitive materials as mirror materials like silver can be protected by said barrier layers. Such mirrors could be placed on a polymer containing carrier which is at least in placed provided with the barrier, e. g. on a side remote from the mirror.

Atomic layer deposition, ALD for short, has been recently identified as a technique capable of creating the requisite barrier layers. However, these layers are typically ceramic layers of, for example, $Al_2O_3$, $TiO_2$, $ZrO_2$ or $HfO_2$ and are thus susceptible to cracking and delamination when mechanical force is applied either during the device production or subsequent use, and are therefore not foreseen to play a major role in any relevant industrial process.

To combat this problem, ALD's sister technique molecular layer deposition, MLD for short, which is capable of depositing organic materials like alucone (aluminium oxide—organic hybrid polymer thin film), titanicone (titanium oxide—organic hybrid polymer thin film), zincone (zinc oxide-organic hybrid polymer thin film) or zircone (zirconium oxide—organic hybrid polymer thin film) has also been tested as a means to produce barrier layers. These materials, however, suffer from long-term stability issues, and some of these materials show shrinking up to 22% after deposition. Furthermore, combinations of these two techniques, in particular multilayer organic/inorganic superlattices, do not confer the advantages of each material but merely combine the disadvantages.

Therefore, in spite of the extreme precision in thin film deposition and the efficiency of ALD produced layers as permeation barriers, the ALD-deposited thin films may only act as efficient permeation barriers if a substrate to which said thin film is applied is rigid and mechanical bending is not applied during the production or subsequent use.

The method described here might be regarded as a modification of an ALD or MLD process such that a chosen, highly-reactive, in particular organo-metallic vapor is diffused into a carrier body. By said diffusion, it is possible to consume water trapped inside the polymer film of the carrier body and/or to further cross-link the polymer material. Though the method is described in particular with a view to polymer materials, it should be noted that this method may work with any soft material, too. The terms "soft materials" or "soft matter" particularly refer to colloids, liquid crystals, foams, polyelectrolytes, rubbers, surfactants, gels, granular materials, biological materials and mixtures thereof.

The cross-linking in the polymer with the polymeric chains inside the polymer film and induced by the reagent gas improves barrier properties and at the same time maintains mechanical flexibility in comparison to rigid ceramic thin films described above in conjunction with ALD. The described method can, in principle, be performed in an ALD or MLD reactor. However, the method could also be used with any suitable gas handling system at any suitable temperature and pressure such that the chemical reaction can be performed in a controlled manner analogous to chemical vapor phase deposition, CVD for short, or metal-organic chemical vapor phase deposition, MOCVD for short, for example.

In accordance with at least one embodiment, method step C) is performed with a low, first pressure. The first pressure is preferably at most 500 mbar or 200 mbar or 100 mbar or 50 mbar or 25 mbar or 15 mbar. Alternatively or in addition, the first pressure is at least 0.1 mbar or 1 mbar or 2 mbar or 5 mbar. The first pressure can originate completely or, preferably, only in part from the at least one reagent gas. Thus, the mentioned numerical values of the first pressure can refer to a partial pressure of the reagent gas or a partial pressure of all reagent gases together or can refer to a total gas pressure. Preferably, the first pressure originates from the reagent gas and a carrier gas, the carrier gas can be an inert gas like Ar or $N_2$. A quotient by atomic or molecular percent of the carrier gas to the reagent gas is, for example, at least 100 or 50 or 20 or 10 or 7 or 6 or 4 or 2 or 1 and/or at most 0.2 or 0.5 or 1 or 2 or 4 or 10. As an alternative, no carrier gas is used. The first pressure is temporarily or wholly reached during method step C).

In accordance with at least one embodiment, in step D) a lower, second pressure is at least temporally reached. The second pressure is smaller than the first pressure. For example, the second pressure is at most 1 mbar or 0.1 mbar or 0.02 mbar or 0.005 mbar. Alternatively or in addition, the second pressure can be at least to $10^{-5}$ mbar or $10^{-4}$ mbar or $10^{-3}$ mbar. These values for the second pressure can refer to a total gas pressure or to a partial pressure of the at least one product gas. Thus, in principle the second pressure could be regarded as vacuum relative to the first pressure. Preferably, the first pressure exceeds the second pressure by at least a factor of 10 or 100 or 500.

In accordance with at least one embodiment, method step B) and/or method step C) and/or method step D) are performed in a reactor. It is possible that all method steps B), C) and D) are done in the same reactor without releasing the carrier body from the reactor between said method steps.

In accordance with at least one embodiment, the method steps C) and D) directly follow on each other. Thus, there is no intermediate step between steps C) and D). In particular, no further reagent which intentionally reacts with the at least one reagent gas is used beside the at least one reagent gas in method step C).

In accordance with at least one embodiment, method steps C) and D) are repeated at least twice or thrice or five times or ten times or fifteen times and/or at most 10000 times or 1000 times or 100 times or 50 times or 35 times or 20 times. When repeating method steps C) and D), the method steps preferably directly follow on each other. For example, when repeating these method steps thrice, the order of method steps is C)>D)>C)>D)>C)>D), particularly preferable without any intermediate steps.

In accordance with at least one embodiment, method step C) and/or method step D) has a duration so that the at least one reagent gas and/or the at least one product gas can diffuse into/out of the polymer film in the region the barrier layer is to be produced. To enable diffusion of the reagent gas into the polymer film it is sufficient that the reagent gas gets into the topmost molecular layer of the polymer film and/or adheres to the topmost molecular layer so that the diffusion can take place afterwards. In other words, a duration of each individual method step C) and D) can become comparably long, in particular relative to a standard ALD procedure.

In accordance with at least one embodiment, in step C) the barrier interface is exposed to the reagent gas with the first pressure by at least 0.2 s or 0.5 s or 1 s or 2 s or 5 s or 10 s or 15 s. Alternatively or in addition, the first pressure can be applied for at most 200 s or 120 s or 60 s. The stated times are in particular valid for a temperature of the carrier body of 400 K, corresponding to about 127° C. As the exposure time t is strongly dependent on the temperature T of the carrier body, the exposure time t can as an alternative or in addition be calculated as $t=2\times10^6 e^{-0.028T}$, preferably with a tolerance of at least a factor of 2 or 5 or 10. In this formula, t and T are dimensionless, T is referred to in K and t is referred to in s. With these exposure times it can be ensured that the reagent gas can sufficiently diffuse into the polymer film.

In accordance with at least one embodiment, a total exposure time as a sum of the individual exposure times in all method steps C) together is at least 0.1 s or 0.5 s or 2 s or 5 s.

In accordance with at least one embodiment, for the time during which the second pressure is applied the same is true as for the exposure time of the reagent gas as stated in the previous paragraph. Thus, it can also be ensured that the product gas can sufficiently diffuse out of the polymer film during the time the second pressure is applied.

In accordance with at least one embodiment, the method steps C) and D) are repeated often in short intervals. Short interval can mean that a duration of the exposure to the reagent gas in step C) is just so long that molecules of the reagent gas can diffuse and are adhered to the topmost one or two molecular layers of the polymer film. For example, an average exposure time in step C) is then at least 1 ms or 10 ms and/or at most 100 ms or 50 ms. In this case it is possible that the method is performed under normal pressure, in particular under a total atmospheric pressure between 900 mbar and 1100 mbar inclusive. Preferably, the method is then performed with an apparatus as described in document DE 10 2012 207 172 A1, the disclosure content of this document is incorporated by reference. Using such a method, the numerical values for the first and second pressures as described above can refer to the partial pressure of the reagent gas and the product gas, respectively.

In accordance with at least one embodiment, during method steps C) and/or D) an elevated pressure is applied. Thus, a total pressure is at least 1.5 bar or 2 bar or 5 bar. For the partial pressure of the reagent gas and/or the product gas, the same can be true as described above. As an alternative, in method step C) the partial pressure of the reagent gas can exceed 0.1 bar or 0.2 bar or 0.5 bar or 1 bar or 2 bar.

In accordance with at least one embodiment, exactly one reagent gas is used. In this context of course an inert carrier gas for the reagent gas like Ar or $N_2$ is not regarded as being part of the reagent gas. Especially, the reagent gas is not water and does not contain water in significant amounts. Hence, the barrier layer is then produced without the use of $H_2O$, particularly preferable, in the absence of any significant amount of $H_2O$.

In accordance with at least one embodiment, the reagent gas intentionally only reacts with the polymer or the polymer chains. This may not rule out that a secondary reaction takes place which leads to a consumption of remaining, undesired water and/or oxygen within the region the barrier layer is to be created. It is possible that in the completed barrier layer residual water remains. However, said residual water is not necessary for forming the barrier layer.

In accordance with at least one embodiment, the reagent gas or at least one of the reagent gases or all reagent gases are selected from the group consisting of organic compounds, metalorganic compounds organometallic compounds, halides and chalcogenides.

In accordance with at least one embodiment, the reagent gas or the reagent gases is/are an organometallic precursor. For example, the reagent gas is of one of the formulas $M_2R_{2n}$ and MRn in which M is a metal and n is 2, 3 or 4. Particularly, M stands for Al, Hf, Ti, W, Zn, Zr. If there is a plurality of precursors, different precursors could contain different metals. R is preferably an organic residual like an alkyl group, an alcohol group or an aryl group, or also a halogen like Cl. It is not necessary that all residuals in said formulas are the same.

In accordance with at least one embodiment, the polymer or at least one of the polymers or all of the polymers of the polymer film is/are at least one of a polyester like polyethylene naphthalate (PEN) or polyethylene terephthalate (PET) or polybutylene terephthalate (PBT) or polytrimethylen terephthalat (PTT) or a polycarbonate (PC), an aliphatic polyether like paraformaldehyde or polyethylene glycol (PEG) or polypropylene glycol (PPG) or polytetramethylene glycol (PTMG) or polytetramethylene ether glycol (PT-MEG), an aromatic polyether like polyphenyl ether (PPE) or poly(p-phenylene oxide) (PPO), a polyetherketone (PEK) like a polyaryletherketone (PAEK) or a polyetherketoneketone (PEKK) or a polyetheretherketon (PEEK), an unsaturated polyester resin, a polyolefin like polytetrafluoroethylene (PTFE), a polyamide, a polyamide-imide, a polyurethane, a polyimide, a polylactide or a polyketide. The polymer could be multi-functional and could be a copolymer or a block-copolymer and may have hydrophobic and hydrophilic parts.

In accordance with at least one embodiment, the reagent gas is $(CH_3)_3Al$, $(CH_3)_6Al_2$ and/or $(C_2H_5)_2Zn$ and the polymer is polyethylene terephthalate, PET for short.

In accordance with at least one embodiment, the chemical reaction includes bridge-forming between at least two functional groups, between at least two side chains or between at least one side chain and at least one functional group of two subunits comprised of monomers and/or oligomers of the at least one polymer or polymer chains of the polymer. Particularly, exactly two or three or four functional groups and side chains are involved in the bridge-forming.

In accordance with at least one embodiment, the bridges formed in the chemical reaction include one or more than one atom or molecule of the reagent gas. Preferably, said at least one atom or molecule is covalently bound to the at least two subunits comprised of monomers or oligomers of the polymer or of the polymer chains which are involved in the bridge-forming. Thus, by means of the bridges a degree of cross-linking in the barrier layer can be increased. By this increase in the cross-linking, the barrier properties in the barrier layer can be greatly improved.

In accordance with at least one embodiment, by means of the chemical reaction only gases are produced, besides the forming of the bridges. In other words, outside the polymer and the bridges no more liquid or solid products are produced by said chemical reaction. In particular, in this case no additional solid state film is produced outside the polymer film and no additional solid state film is formed onto the outer boundary surface and/or barrier interface.

In accordance with at least one embodiment, a water content in the barrier layer of the polymer film is at most 0.1% or 0.05% or 0.02% or 00.1% by mass after producing the barrier layer. Hence, in the context of the present application the finished barrier layer can be regarded as being free of water.

In accordance with at least one embodiment, the barrier layers shows a gradient in a concentration of a constituent of the reagent gas. For example, if the constituent of the reagent gas is a metal atom like Al or Zn, then the Al or Zn concentration shows a gradient. A maximum concentration is then preferably present at or near the barrier interface and decreases, in particular monotonically and continuously decreases, in a direction to the inner of the polymer film. Thus, a thickness of the barrier layer could be defined as a region near the barrier interface in which a concentration of the constituent from the at least one reagent gas in the polymer film amounts to at least 1/e, or about 37%, of a maximum concentration of said constituent in the polymer film. By way of example, the concentration as well as the gradient and, thus, the thickness might be measured by means of transmission electron microscopy, TEM for short, scanning electron microscopy, SEM for short, X-ray reflectivity, XRR for short, or X-ray photoelectron spectroscopy, XPS for short.

In accordance with at least one embodiment, the thickness of the barrier layer is at least 1 nm or 2 nm or 5 nm or 10 nm or 20 nm or 50 nm or 100 nm. Alternatively or in addition, the thickness is at most 200 nm or 400 nm or 600 nm or 1 µm. Thus, the barrier layer is comparably thin, in particular compared with an average thickness of the polymer film and/or of the carrier body. In other words, the barrier layer may not significantly contribute to the thickness of the polymer film and/or the carrier body but can predominantly determine its permeability against oxygen and water.

In accordance with at least one embodiment, the barrier layer is the layer of the polymer film which comprises a constituent of the reagent gas, in particular a metal from the reagent gas, with a concentration of at least $10^{-3}$ atom-% or 0.02 atom-% or 0.1 atom-% or 0.4 atom-%. Alternatively or in addition, said concentration is at most $_5$ atom-% or 2 atom-% or 1 atom-% or 0.5 atom-%.

In accordance with at least one embodiment, the barrier interface and/or the barrier layer and/or the outer boundary surface is free of a layer, in particular a closed layer, of a ceramic and/or an oxide and/or a nitride and/or an oxynitride, after producing the barrier layer. Hence, the method then does not include the step of growing a closed layer, for example, a ceramic layer, onto the boundary surface and/or the barrier interface. The permeability is, thus, not adjusted by an additional layer but by a modification of the material in the polymer film which forms the barrier layer.

In accordance with at least one embodiment, after producing the barrier layer an additional functional layer is applied to the carrier body, for example, directly onto the polymer film. The additional functional layer is, for example, an adhesion improving layer, a lacquer layer, a colored layer, a metallic layer in particular for electrical conductor tracks and/or a further polymer layer. It is also possible that another polymer film is applied in which another barrier layer is produced. The additional functional layer is preferably mechanically flexible.

In accordance with at least one embodiment, by producing the barrier layer a hardness of the barrier interface and/or of the outer boundary surface is changed by a maximum of 50% or 20% or 10%. Thus, the hardness of the carrier body and preferably its Young's modulus, too, is virtually unaffected by the forming of the barrier layer.

In accordance with at least one embodiment, method step B) includes a heating of the polymer film. Preferably, the polymer film and/or the carrier body are heated to a temperature of at least 50° C. or 75° C. or 100° C. and/or to at most 250° C. or 200° C. or 150° C. or 125° C. During step B), the second pressure as used in step D) can also be applied. Thus, in step B) a vacuum can be applied. As an alternative or in addition, the barrier interface and/or the boundary surface and/or the polymer film is flushed with an essentially water free gas. With said temperature treatment and/or gas treatment, an efficient drying can be reached. Preferably, no plasma treatment is performed during or around method step B).

In accordance with at least one embodiment, a process temperature of the carrier body and/or the polymer film during method step C) is at least 50° C. or 70° C. or 100° C. and/or at most 420° C. or 250° C. or 220° C. or 160° C. or 125° C. By such a temperature in step C), the polymer film is prevented from destruction while an efficient diffusion of the reagent gas and/or the product gas can be achieved. As an alternative or in addition, the temperature of the carrier body and/or the polymer film during method step B) and/or method step C) amounts to at least 0.8 $T_g$ or 0.95 $T_g$ or $T_g$ or 1.1 $T_g$ or 1.2 $T_g$, wherein $T_g$ is the glass-transition temperature of the polymer film in ° C. Moreover, as an alternative or in addition, the temperature during method steps B) and/or C) is at most 0.7 or 0.8 or 0.9 of $T_m$ and/or $T_d$, wherein $T_m$ is the melting temperature in ° C. and $T_d$ is the decomposition temperature in ° C. of the polymer film.

In accordance with at least one embodiment, the carrier body is a foil. It is possible that the carrier body then consists of the one or of the plurality of polymer films. Preferably, a thickness of the carrier body is then at least 25 µm or 40 µm or 60 µm and/or at most $_{750}$ µm or 500 µm or 200 µm or 120 µm. Thus, the carrier body can be comparably thin. The foil can be of a plane parallel fashion and, thus, can have a constant thickness, maybe with a tolerance of at most 15% or 5% or 1% of an average thickness of the foil.

In accordance with at least one embodiment, the carrier body is mechanically flexible after finishing the barrier layer. Mechanically flexible can mean that the carrier body can be bent with a bending radius of e.g. 10 cm for at least ten times at room temperature without damaging the carrier body, the polymer film and the barrier layer. This can be reached by the feature that the barrier layer is an integral component of the polymer film and is not applied as a separate layer to the boundary surface of, for example, the polymer film.

In accordance with at least one embodiment, all free boundary surfaces and/or all free surfaces of the polymer film are provided with the barrier layer. In particular, if the carrier body is a foil composed of the polymer film, the barrier layer is formed in the polymer film at the two main sides of the foil.

Also provided is a carrier body which is produced by a method, as described in conjunction with one or several of the aforementioned embodiments. Features of the carrier body are therefore also disclosed for the method and vice versa.

According to at least one embodiment, the carrier body comprises a polymer film of at least one polymer. The carrier body also comprises a barrier layer formed in the polymer film. The barrier layer includes a plurality of bridges between at least two different subunits comprised of monomers or oligomers of the at least one polymer. The bridges comprise at least one metal atom which is covalently bound to the at least two subunits.

In accordance with at least one embodiment, at least one organic layer sequence is applied to the carrier body. The organic layer sequence comprises at least one active area for producing visible radiation. Thus, the carrier body and the organic layer sequence can be part of an organic light emitting diode, OLED for short. For example, the at least one carrier body is a carrier and/or an encapsulation for the OLED. Preferably, the carrier body shows a high transmittance for the light generated in the organic layer sequence. Alternatively, the carrier body can be opaque for visible light.

BRIEF DESCRIPTION OF THE DRAWINGS

A carrier body and a method described in this case will be explained in greater detail hereinafter with reference to the drawing with the aid of exemplified embodiments. Like reference numerals designate like elements in the individual figures. However, none of the references are illustrated to scale. Rather, individual elements can be illustrated excessively large for ease of understanding.

In the drawing.

DETAILED DESCRIPTION OF ILLUSTRATIVE EMBODIMENTS

In FIG. 1, method steps for producing a barrier layer 22 in a polymer film 2 are shown. According to FIG 1A, a carrier body 1 is provided. The carrier body 1 is a foil and consists of the polymer film 2. For example, the polymer film 2 is made of polyethylene terephthalate, PET for short, and has a thickness of 50 µm, 75 µm or 100 µm. In particular, the carrier body 1 is a polyester film Melinex 401 CW or Melinex ST 504. An outer boundary surface 10 of the carrier body 1 is identical with a barrier interface 20 to be created by producing the barrier layer 22.

Figure 1A:
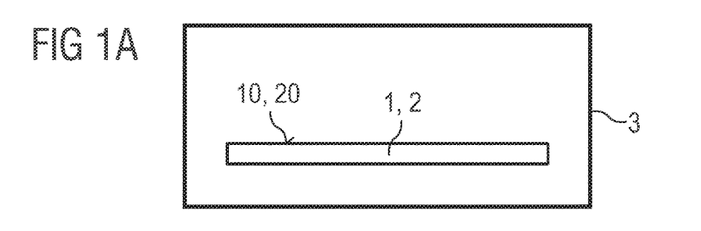
FIGS. 1, 4 and 7 show schematic sectional views of method steps for producing a carrier body described in this case.

Further, as shown in FIG. 1A, the carrier body 1 is brought into a reactor 3. The reactor 3 is designed to perform processes like ALD or CVD in it. Preferably, all the method steps shown in FIG. 1 are done in the reactor 3 without releasing the carrier body 1 from the reactor 3.

Figure 1B:
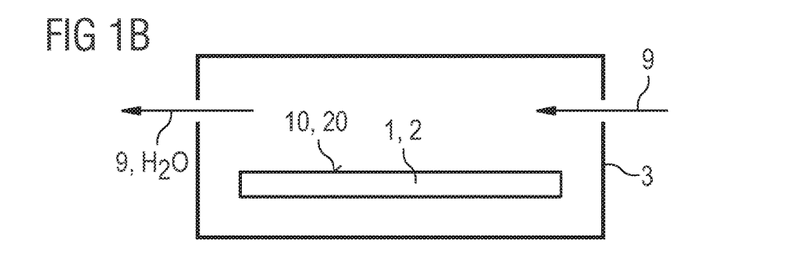

According to FIG. 1B, the boundary surface 10 is dried. In other words, water is removed from the boundary surface 10. For drying, flushing with a drying gas 9 and/or vacuum is applied. The drying gas 9 can be nitrogen with a gas grade of 5.0, which is essentially free of water.

Moreover, a temperature of the carrier body 1 is preferably increased during drying, for example, to about 100° C. With this combination of elevated temperature and low water partial pressure, the boundary surface 10 can be efficiently dried. Further, water is also removed or reduced in concentration in an area of the carrier body 1 near the boundary surface 10. For example, the vacuum or the flushing with the drying gas 9 is maintained for at least 30 s or 120 s.

No cleaning with a plasma like oxygen plasma or ozone plasma is required. On the contrary, by such plasma methods undesired water may be produced near the barrier interface 20.

Figure 1C:
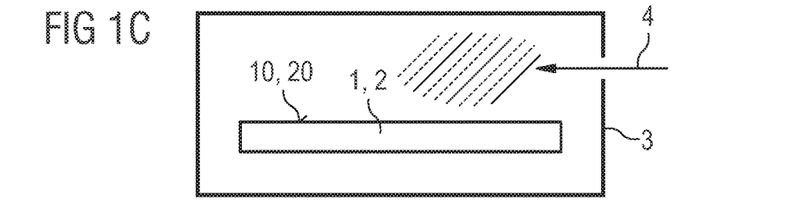

In the method step of FIG. 1C, the reactor 3 is flooded with a reagent gas 4 together with a carrier gas. The carrier gas is not shown in the figures. The reagent gas 4 is $(CH_3)_6Al_2$ and/or $(CH_3)_3Al$, also referred to as trimethylaluminum or TMA, for short, or the reagent gas 4 is $(C_2H_5)_2Zn$. A first pressure of the reagent gas 4 together with the carrier gas is about 10 mbar, for example.

Thus, the polymer film 2 is exposed to the reagent gas 4 which is at least one reactive organic or inorganic molecule from the vapor phase in the absence of a solvent.

In order to save reagent gas 4, the reagent gas 4 is preferably introduced only during a short pulse, for example, with a pulse length of between 100 ms and 200 ms. A fraction of the reagent gas 4, relative to the carrier gas, is preferably around 20 volume-%. The reagent gas 4 is schematically indicated by a hatching.

Figure 1D:
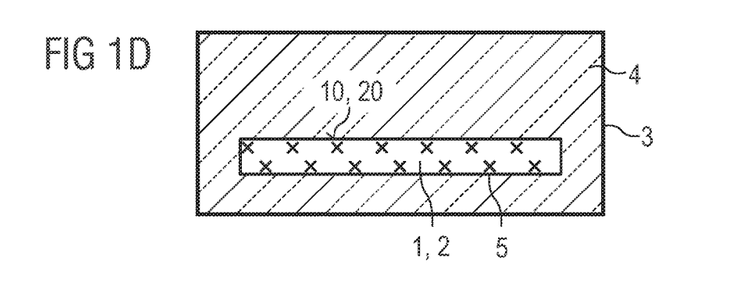

According to FIG. 1D, the boundary surface 10 is exposed to the reagent gas 4 for a comparably long time. The exposure time is preferably around 30 s. This method step is optional and could be replaced by a longer taking method step as shown in conjunction with FIG. 1C. By means of the comparably long exposure time, it can be ensured that the reagent gas 4 not only reaches the boundary surface 10 but also diffuses into the polymer film 2 of the carrier body 1 to a sufficient depth. The diffusion depth is preferably at least 10 nm or 20 nm or 40 nm and/or at most 600 nm or 400 nm or 250 nm, for example, around 50 nm.

The diffusion depth is the depth in which a concentration of the reagent gas 4 in the polymer film 2 has dropped to 1/e or about 37%, relative to a concentration of the reagent gas 4 directly at the boundary surface 10. Depending on the material of the polymer film 2, the reagent gas 4 and its partial pressure, and a temperature of the carrier body 1, the exposure time should preferably be adjusted to obtain the desired diffusion depth.

As the reagent gas 4 is very reactive, the reagent gas 4 undergoes a chemical reaction with the polymer of the polymer film 2 as explained in more detail in the context of FIG. 2 below. Because of said chemical reaction, a cross-linking in the polymer of the polymer film 2 is increased. Furthermore, the reagent gas 4 is consumed to some extent and a product gas 5 is produced. In FIG. 1D, the product gas 5 is schematically indicated by crosses. The product gas 5 is an alkyl like methane, for example. Due to the product gas 5 present in the polymer film 2, the chemical reaction between the polymer and the reagent gas 4 and/or a further diffusion of reagent gas 4 into the polymer film 2 is hindered. Thus, after some time the chemical reaction is disrupted.

Figure 1E:
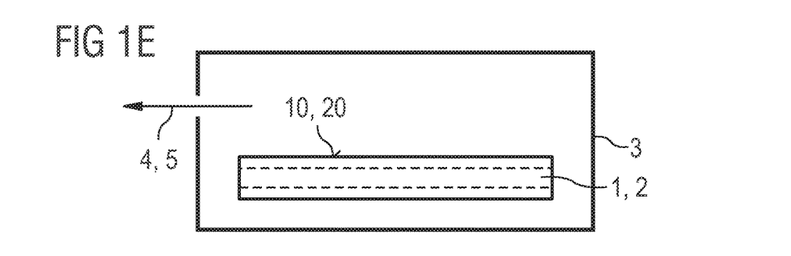

As is shown in FIG. 1E, the remaining reagent gas 4 and the at least one product gas 5 are removed by evacuation. This method step continues until a lower, second pressure is reached. The lower, second pressure is, for example, a factor of 1000 smaller than the first pressure in order to qualitatively remove the gases 4, 5. By way of example, the second pressure is 0.01 mbar.

During the method steps of FIGS. 1C, 1D and 1E, an elevated temperature is set. Particularly, the temperature is between 100° C. and 120° C. With this temperature, an improved diffusion of the reagent gas 4 into and of the product gases 5 out of the carrier body 1 can be achieved while maintaining short time intervals for the method steps according to FIGS. 1D and 1E. If the temperature is decreased or increased, the time intervals for the method steps 1D and 1E should accordingly be adapted.

Figure 1F:
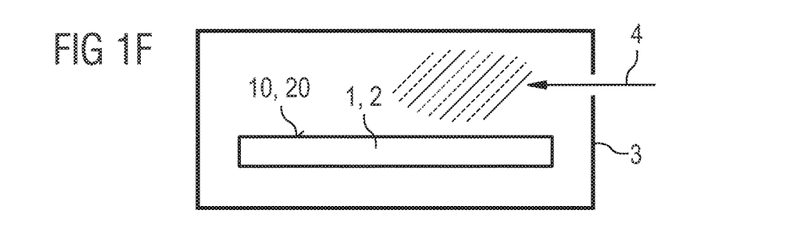
Figure 1G:
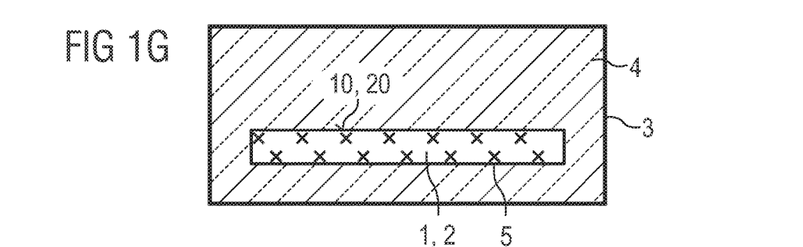
Figure 1H:
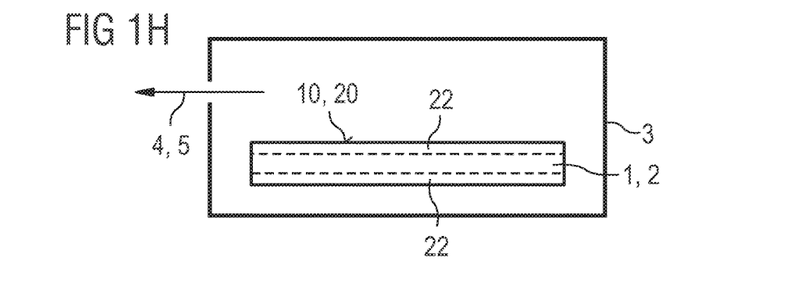

In order to achieve a sufficient cross-linking in the barrier layer 22 and, thus, the desired impermeability against oxygen and/or water vapor, the method steps of FIGS. 1C, 1D and 1E are repeated, compare FIGS. 1F, 1G and 1H. Other than shown, these method steps can be repeated more than twice. Particularly because of the removal of the at least one product gas 5, the cross-linking and the forming of the barrier layer 22 can be enhanced.

All the method steps as shown in FIG. 1 are preferably done in the stated order without any intermediate steps. The method is performed without the use of water and preferably with only one reagent gas 4. No additional layer like a ceramic layer is applied to the boundary surface 10.

FIG. 2 shows schematic structural formulas of the polymer.

Figure 2A:
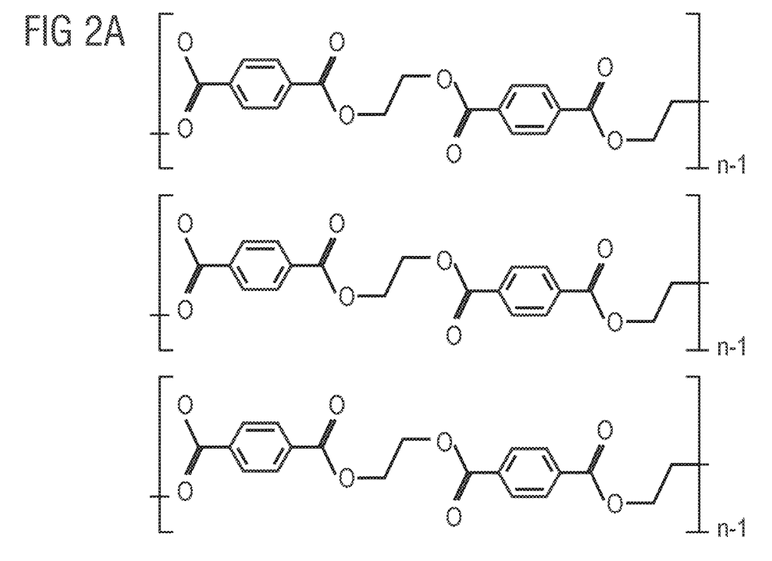
FIG. 2 shows a schematic structural formula of a barrier layer described in this case.

In FIG. 2A, three subunits comprised of monomers or oligomers of three polymer chains with a length n of the untreated polymer are shown. The polymer is polyethylene terephthalate as used in connection with FIG. 1. There is no or no significant cross-linking between the polymer chains. Because of the lack of cross-linking, the polymer can be regarded as a kind of sponge with a considerable number of small cavities. Through such cavities, diffusion of gases like oxygen and water occurs at a comparably high rate. In other words, in particular said cavities result in the typically high permeability of polymer films.

Figure 2B:
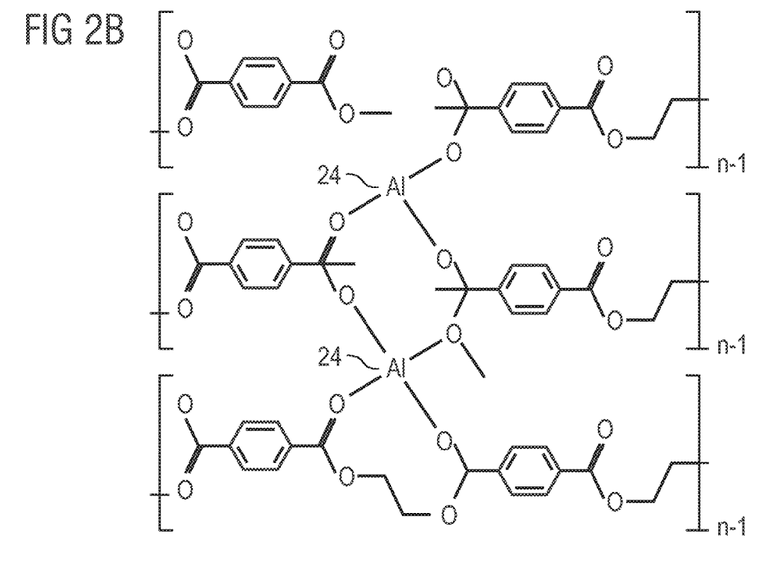

In FIG. 2B, the modified polymer in the barrier layer 22 produced with the described method is shown. In very brief, by means of an electrophile attack, $Al^{3+}$ from the reagent gas is covalently attached to the carbonyl oxygen of the polymer. The carbonyl carbon is nucleophilicly attacked by $CH_2^{2-}$ and $CH_3^-$. Thus, a cross-linking between the polymer chains is achieved by bridges 24, the bridges 24 include the metal of the precursor of the reagent gas. As other products of the chemical reaction like methane are removed and, thus, are of no greater importance in the present case, these products are not highlighted in connection with FIG. 2.

Figure 2C:
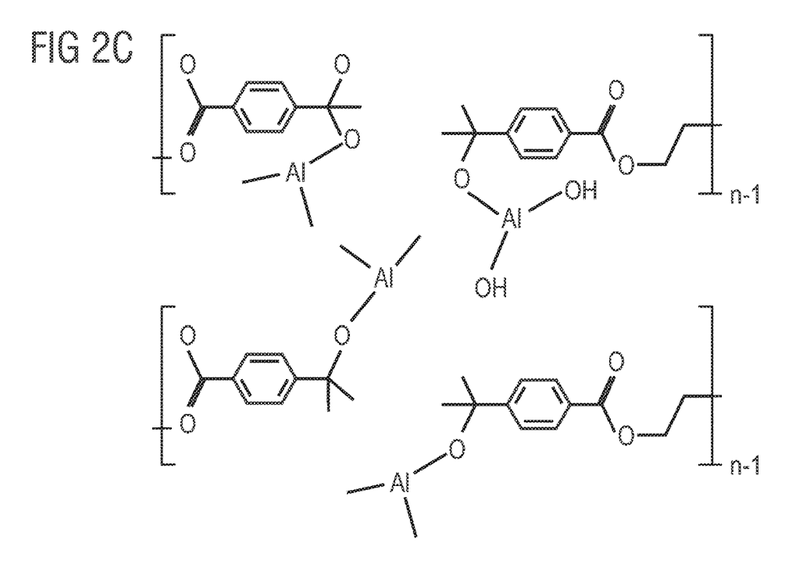

According to FIG. 2C, without removal of the other products individual reactions between the TMA and the PET occur too, similar to what is shown in FIG. 2B. However, in particular because of the other products of the reaction and higher dose of TMA if supplied in a single and very high dose the cross-linking is hindered. Exposed to air and, thus, with the influence of water, the Al forms $Al(OH)_x$ which is only able to form weak hydrogen bonds. Hence, without the removal of the product gases the chemical reaction of FIG. 2B is suppressed and the described barrier layer is not formed. Instead, as indicated in FIG. 2C, the polymer may be destroyed to a certain extent. Therefore, supply of multiple smaller doses of the reagent with intermediate product removal are preferred.

Figure 3:
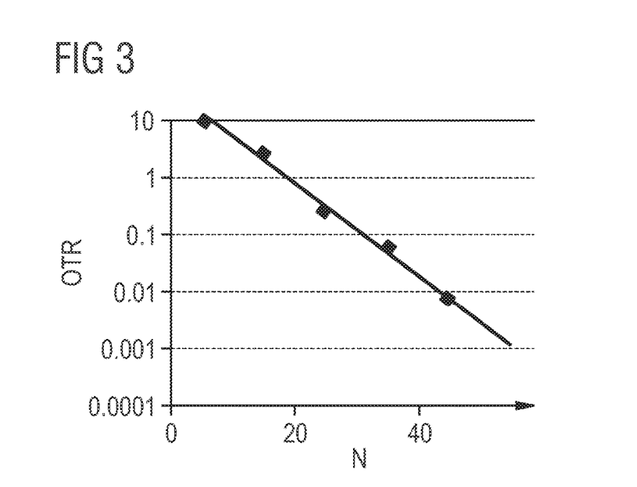
FIG. 3 shows a permeability against oxygen in dependency of the number of cycles used to produce the barrier layer described in this case.

In FIG. 3, the effect of the barrier layer 22 is illustrated. An oxygen transmission rate, OTR for short, of a PET Melinex ST 504 foil processed with TMA at 120° C. as described in connection with FIG. 1 is shown. The OTR is drawn against the number N of cycles. In other words, the method steps according to FIGS. 1C to 1E have been repeated N times. The OTR is measured in $cm^3$ (STP) per $m^2$ and day and bar, $cm^3$ (STP)/($m^2$ d bar), wherein d stands for day and STP stands for Standard Temperature and Pressure. The measurement was done with a $PSt_9$ sensor from PreSens Precision Sensing GmbH, Germany.

Up to about 50 cycles, the OTR exponentially falls by about four orders of magnitude. The logarithmic ordinate scale should be noted. An expected drop of the OTR with a higher number N of cycles could not be resolved in the measurement.

Figure 4:
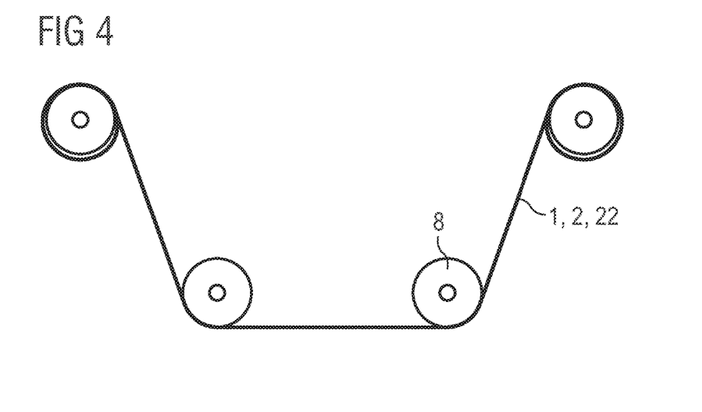

In FIG. 4 it is illustrated that the produced carrier body 1 with the finished barrier layer 22 is mechanically flexible and remains intact in a roll-to-roll process with different rolls 8. Thus, the produced carrier body 1 can easily be applied to different manufacturing procedures with a high production volume and with simplified handling.

Thus, the exposure of a polymeric carrier body 1 to vapors of highly reactive precursors like trimethyl aluminum, diethyl zinc and so on for a duration of time largely exceeding exposures typical of an ALD or MLD process allows diffusion, chemical binding, consumption of latent $H_2O$, and cross-linking of the polymer chains. The dosing duration, i.e., the number of pulses, pulsing times, and exposure times, determines the depth of diffusion into the polymer film 2 and the degree of cross-linking. The resulting organic/inorganic hybrid material in the sub-surface region of the boundary surface 10 of the polymeric carrier body 1 shows significant improvement of the barrier properties in comparison to the untreated polymer, while at the same time maintaining a large degree of crack resistance upon mechanical bending of the substrate.

A comparison between the carrier body 1 of FIG. 1 processed with the described method on the one hand and processed with a conventional ALD method on the other hand reveals the following results:

Thin film coatings with 5 nm to 50 nm thickness of $Al_2O_3$ produced with conventional ALD result in significant improvement of the barrier properties against oxygen of more than 4 orders of magnitude in comparison to the untreated reference samples. However after bending the samples ten times over a radius of 10 cm, the permeation increases again by two to three orders of magnitude. Thus, by multiple bending the effect of the ALD layer to permeability has nearly vanished.

Samples treated with the infiltration method as described in connection with FIG. 1 with five to 50 infiltration cycles improve the barrier properties gradually from one to four orders of magnitude, compare FIG. 3. Bending of the sample results in slight a loss of barrier properties of only one order of magnitude at a maximum, confirming an enhanced mechanical flexibility of the resulting subsurface barrier layer 22.

The infiltration method described here is significantly distinct from the standard ALD or MLD process in terms of processing as well as resulting material: First, the method described here is neither an ALD nor a MLD process as it does not follow the principles of chemisorbed surface reactions that are controlled temporally through pulse/purge steps. Second, ALD/MLD processes require two precursors and, third, result in a distinct surface coating. The infiltration method described here preferably uses only one precursor, though the use of multiple precursors or reagent gases is possible, and binding sites below the surface are the targets of the described chemical reaction.

The infiltration process described here may be further extended to substitution of typical metal-organic precursors with organic reagents such as fluorinated compounds for combining hydrophobicity and cross-linking in the sub-boundary surface and boundary surface area of the polymer film 2 and of the carrier body 1.

Figure 5:
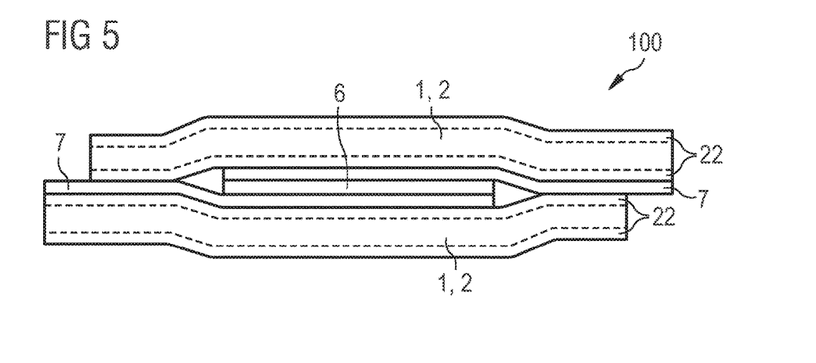
FIGS. 5 and 6 shows a schematic sectional view of an OLED comprising a carrier body described in this case, and FIG. 8 schematically shows a concentration gradient in the barrier layer described here.

In FIG. 5, the carrier body 1 with the barrier layer 22 is used as a carrier and as an encapsulation for a flexible OLED device 100. The OLED 100 comprises an organic layer sequence 6 which is arranged between two electrodes 7. During operation of the OLED 100, light is generated in the organic layer sequence 6. The mechanically flexible electrodes 7 might be formed of a transmissive material like a transparent conductive oxide, for example, indium tin oxide or zinc oxide, or like a thin metal film. The organic layer sequence 6 is arranged between the two carrier bodies 1, which in each case are a polymer foil.

Other than is shown in FIG. 5, the barrier layer 22 can be present at only one side of the carrier body 1, as is also possible in all other exemplary embodiments. In FIG. 5, the barrier layer 22 is symbolically separated from the remaining parts of the carrier bodies 1 by a dashed line although the barrier layer 22 is not a separately applied layer but an integral part of the polymer film 2.

Figure 6:
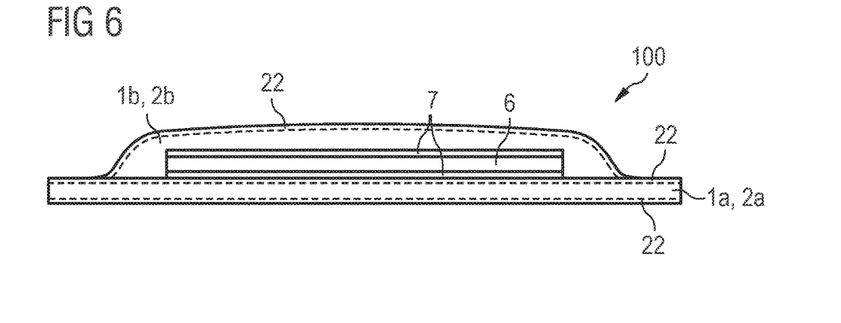

In FIG. 6, a sectional view of another exemplary embodiment of an OLED 100 is shown. The OLED 100 comprises a first carrier body is which is a carrier of the OLED 100. The first carrier body is is a polymer foil consisting of the polymer film 2a. On both sides of the polymer film 2a, one of the barrier layers 22 is formed. Onto this first carrier body la, the organic layer sequence 6 and the two electrodes 7 are formed.

Afterwards, for encapsulation of the organic layer sequence 6, the second carrier body 1b is formed. For example, a material for the second carrier body 1b is applied in liquid form and then cured to form the second polymer film 2b. Thus, the carrier body 1b can be made of a polymeric lacquer. Then, the barrier layer 22 is formed in the second polymer film 2b, in the same way as described in connection with FIG. 1. With the forming of the barrier layer 22 in the second polymer film 2b, it is possible that the barrier 22 in the first carrier body 1a on a side remote from the organic layer sequence 6 increases in thickness.

Figure 7:
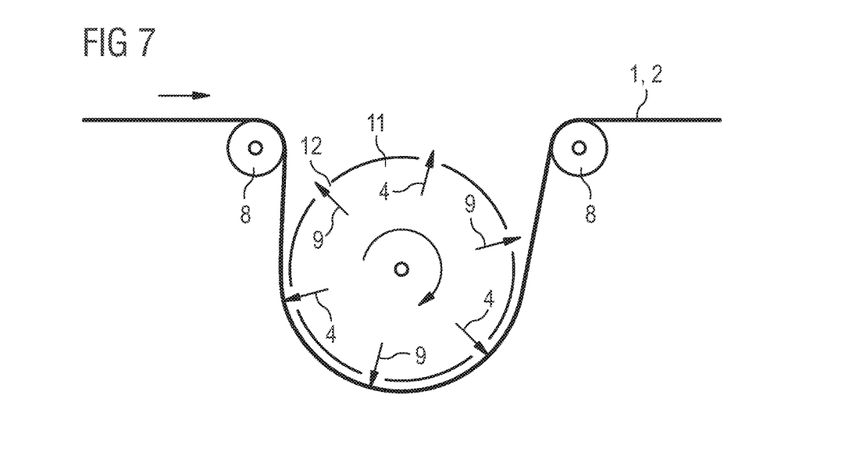

In FIG. 7, another method for producing the barrier layer 22 is shown. According to FIG. 7, an apparatus as described in the document DE 10 2012 207 172 A1 is used. Thus, the carrier body 1 and, hence, the polymer film 2 are treated with a rotating head 11 comprising a plurality of gas outlet openings 12. Through these gas outlet openings 12, the reagent gas 4 and the drying gas 9 are alternatingly applied to the polymer film 2. By adjusting a forward speed of the polymer film 2 and a rotational velocity of the rotating head 11, a number of cycles of the method steps of applying the reagent gas 4 and of removing the product gas by means of the drying gas 9, for example, can be set. Thus, a thickness of the barrier layer 22 to be created can be set, too.

The method of FIG. 7 can be performed with the pressures and temperatures as described in connection with FIG. 1. However, preferably normal pressure (about 1013 mbar) is chosen so that the barrier layer can be produced outside a reactor and by means of a roll-to-roll method. For example, a partial pressure of the reagent gas is between 0.5 mbar and 50 mbar in each case, particularly around 5 mbar. Moreover, a high number of repetitions of the method steps is applied but a small exposure time in each single step. The exposure time is long enough to ensure that the reagent gas 4 can diffuse and adhere at least into the topmost polymer layers of the polymer film 2.

Other than shown, more than one reagent gas4 can be used. Further, it is possible to use higher or even lower pressures than stated in the previous paragraph.

Figure 8:
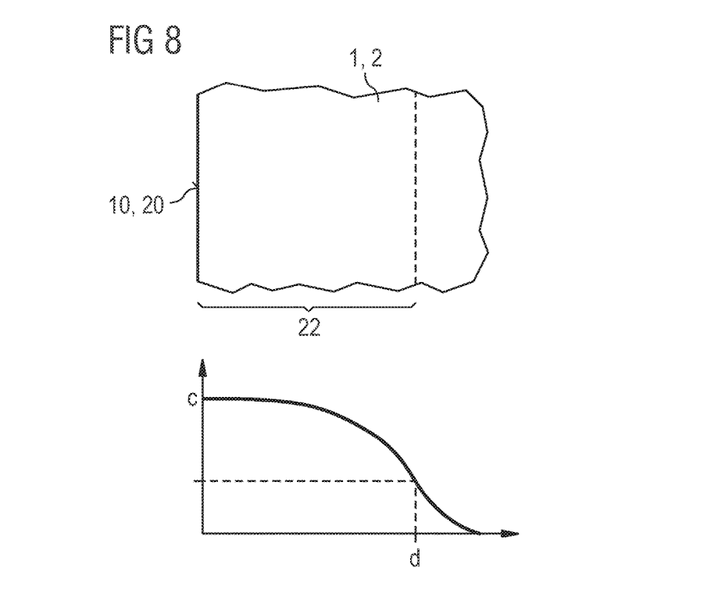

FIG. 8 illustrates a concentration c of a constituent of the reagent gas in the finished barrier layer 22. In context of FIG. 1, the constituent is Al or Zn. The concentration c of said constituent gradually decreases in a direction away from the barrier interface 20. A maximum concentration c is reached near the barrier interface 20. A thickness d of the barrier layer 22 is the region in which the concentration c of said constituent is above 1/e of the maximum concentration.

Carrier bodies and polymer films described here can be used for electronic devices and high-end products like OLEDs to perform a cost-efficient encapsulation. Moreover, it is also possible to use such barrier layers, in particular comparably thin barrier layers with a thickness of just a couple of nanometers, in lower-cost products, for example, as packaging material for food. Further, composite carrier bodies can be used in which the barrier layer is applied to only a part of a surface and another part of a surface is covered with a metal, for example.

The invention is not limited by the description using the exemplified embodiments. Rather, the invention includes any new feature and any combination of features included in particular in any combination of features in the claims, even if this feature or this combination itself is not explicitly stated in the claims or exemplified embodiments.

The invention claimed is:

1. A method for producing a barrier layer in a polymer film, the method comprising:
   A) providing a carrier body comprising the polymer film, wherein the polymer film includes at least one polymer, and wherein the polymer film forms a barrier interface of the carrier body;
   B) drying the barrier interface;
   C) exposing the barrier interface to one reagent gas, or to a plurality of reagent gases which do not chemically react with each other, so that the at least one reagent gas chemically reacts with the at least one polymer at least inside the polymer film in at least one chemical reaction thereby forming the barrier layer, wherein inside the polymer film means that the at least one reagent gas chemically reacts with the at least one polymer in a depth of the polymer film of at least 10 nm; and
   D) removing at least one product gas of the at least one chemical reaction,
   wherein the barrier layer is produced without using $H_2O$.

2. The method according to claim 1,
   wherein step C) is performed with a low, first total pressure of at most 100 mbar,
   wherein in step D) a lower, second total pressure of at most 1 mbar is at least temporally reached, wherein steps C) and D) directly follow each other in a reactor and are directly repeated at least twice, wherein in step C) the barrier interface is exposed to the reagent gas with the first pressure by at least is so that the reagent gas can diffuse into the polymer film, and wherein in step D) the second pressure is applied by at least 2 s so that the at least one product gas can diffuse out of the polymer film.

3. The method according to claim 1, wherein at least method steps C) and D) are performed with a total pressure of at least 500 mbar, wherein step C) is performed with a low, first partial pressure of the reagent gas of at most 50 mbar, wherein in step D) a lower, second partial pressure of the product gas of at most 1 mbar is at least temporally reached, wherein steps C) and D) directly follow on each other and are directly repeated at least four times, and wherein a total exposure time in all method steps C) together is at least 0.5 s.

4. The method according to claim 1, wherein steps C) and D) are repeated at least 20 times.

5. The method according to claim 1, wherein exactly one reagent gas is used, and wherein the reagent gas intentionally only reacts with the polymer.

6. The method according to claim 1, wherein the reagent gas is an organometallic precursor, a metalorganic compound, a halide, a chalcogenide or an organic compound, and wherein the polymer or at least one of the polymers of the polymer film is a polyester, a polycarbonate, a polyaryletherketone, a polyamide, a polyamide-imide, a polyurethane, a polyimide a polylactide, a polyolefin or a polyketide.

7. The method according to claim 6, wherein the reagent gas is $(CH_3)_3Al$, $(CH_3)_6Al_2$ or $(C_2H_5)_2Zn$, wherein the polymer is polyethylene terephthalate, wherein a water content in the barrier layer of the polymer film is at most 0.05% by mass after producing the barrier layer, and wherein a concentration of Al or Zn from the reagent gas which is included into the barrier layer by the chemical reaction gradually decreases in a direction away from the barrier interface towards a substrate of the carrier body.

8. The method according to claim 1, wherein the chemical reaction includes bridge-forming between at least two functional groups, between at least two side chains or between at least one side chain and at least one functional group of subunits comprised of monomers or oligomers of the at least one polymer, the bridges in each case including at least one atom from the reagent gas which is covalently bound to the subunits.

9. The method according to claim 1, wherein in step C) a degree of cross-linking in the barrier layer is increased.

10. The method according to claim 1, wherein a thickness of the barrier layer is between 2 nm and 600 nm inclusive, and wherein the barrier layer is a layer comprising a part of the reagent gas with a concentration of at least 0.02 atom-%.

11. The method according to claim 1, wherein, after producing the barrier layer, the barrier interface is free of a closed layer of a ceramic and/or an oxide and/or a nitride and/or an oxynitride, and wherein by producing the barrier layer a hardness of the barrier interface is changed by a maximum of 20%.

12. The method according to claim 1, wherein step B) includes heating of the polymer film to a temperature of between 50° C. and 200° C. inclusive, the barrier interface is flushed with a water free gas and/or is evacuated, and wherein a process temperature during step C) is between 70° C. and 160° C. inclusive.

13. The method according to claim 1, wherein the carrier body is a foil consisting of the polymer film, a thickness of the foil is between 40 μm and 500 μm inclusive, and wherein, after producing the barrier layer, the carrier body is mechanically flexible.

14. The method according to claim 1, wherein a permeability against water vapor and/or oxygen is increased by at least a factor of two by producing the barrier layer.

15. A carrier body comprising:

a polymer film of at least one polymer, wherein the polymer film forms a barrier interface of the carrier body; and a barrier layer formed inside the polymer film, wherein, after producing the barrier layer, the barrier interface is free of a closed layer of a ceramic and/or an oxide and/or a nitride and/or an oxynitride, wherein the barrier layer comprises a plurality of bridges between different subunits comprised of monomers or oligomers of the at least one polymer or polymer chain, wherein the bridges include at least one metal atom which is covalently bound to the subunits, and wherein the carrier body is mechanically flexible.

16. The carrier body according to claim 15, wherein the barrier layer is formed inside the polymer film in a depth of the polymer film of at least 10 nm.

* * * * *

UNITED STATES PATENT AND TRADEMARK OFFICE
CERTIFICATE OF CORRECTION

PATENT NO. : 10,442,907 B2
APPLICATION NO. : 15/327997
DATED : October 15, 2019
INVENTOR(S) : Frank Vollkommer Page 1 of 1

It is certified that error appears in the above-identified patent and that said Letters Patent is hereby corrected as shown below:

In the Claims

Column 15, Line 4, Claim 2, delete "by at least is so that" and insert --by at least 1s so that--.

Column 15, Lines 31-32, Claim 6, delete "polyary-letherketone" and insert --poly-aryletherketone--.

Column 15, Line 33, Claim 6, delete "a polyimide a polylactide" and insert --a polyimide, a polylactide--.

Signed and Sealed this
Ninth Day of June, 2020

Andrei Iancu
*Director of the United States Patent and Trademark Office*